US007120119B2

(12) United States Patent
Frelechoux et al.

(10) Patent No.: US 7,120,119 B2
(45) Date of Patent: Oct. 10, 2006

(54) MANAGEMENT OF PROTOCOL INFORMATION IN PNNI HIERARCHICAL NETWORKS

(75) Inventors: Laurent Frelechoux, Thalwil (CH); Robert Haas, Adliswil (CH); Michael Osborne, Au (CH)

(73) Assignee: International Business Machines Corporation, Armonk, NY (US)

( * ) Notice: Subject to any disclaimer, the term of this patent is extended or adjusted under 35 U.S.C. 154(b) by 927 days.

(21) Appl. No.: 09/877,479

(22) Filed: Jun. 8, 2001

(65) Prior Publication Data

US 2002/0023065 A1 Feb. 21, 2002

(30) Foreign Application Priority Data

Jun. 8, 2000 (EP) .................. 00112291

(51) Int. Cl.
*G01R 31/08* (2006.01)
(52) U.S. Cl. .............. 370/238; 370/252; 370/255; 370/395.52
(58) Field of Classification Search ........ 370/254, 370/338, 349, 401, 351, 301.1, 310.2, 465, 370/466, 467, 408, 400, 358, 301, 46
See application file for complete search history.

(56) References Cited

U.S. PATENT DOCUMENTS

| | | | | |
|---|---|---|---|---|
| 5,831,975 | A * | 11/1998 | Chen et al. | 370/256 |
| 5,831,982 | A * | 11/1998 | Hummel | 370/396 |
| 5,854,899 | A * | 12/1998 | Callon et al. | 709/238 |
| 5,999,517 | A * | 12/1999 | Koning et al. | 370/255 |
| 6,078,575 | A * | 6/2000 | Dommety et al. | 370/338 |
| 6,201,810 | B1 * | 3/2001 | Masuda et al. | 370/395.32 |
| 6,205,146 | B1 * | 3/2001 | Rochberger et al. | 370/395.53 |
| 6,229,832 | B1 * | 5/2001 | Baba et al. | 372/38.01 |
| 6,243,384 | B1 * | 6/2001 | Eriksson et al. | 370/395.31 |
| 6,333,918 | B1 * | 12/2001 | Hummel | 370/238 |
| 6,456,600 | B1 * | 9/2002 | Rochberger et al. | 370/255 |
| 6,487,204 | B1 * | 11/2002 | Dacier et al. | 370/395.2 |

(Continued)

OTHER PUBLICATIONS

"Topology optimization of IP over ATM", Frelechoux, L.; Osborne, M.; Haas, R.; Universal Multiservice Network, 2000, ECUMN 2000. 1st European Conference on Oct. 2-4, 2000, pp. 122-131.*

(Continued)

*Primary Examiner*—Ricky Q. Ngo
*Assistant Examiner*—Andrew C. Lee
(74) *Attorney, Agent, or Firm*—Douglas W. Cameron; Anne Vachon Dougherty

(57) ABSTRACT

Methods and apparatus are provided for managing protocol information in a PNNI hierarchical network. In a PAR-enabled device (1) of the network, topology indicators (HC, LC) are assigned to protocol information encapsulated in PAR PTSEs received by the PAR-enabled device (1) from the network. The assignment of a topology indicator (HC, LC) to protocol information in a PAR PTSE is dependent on the location of the network node which originated that PAR PTSE in the PNNI topology as seen by the PAR-enabled device (1). Protocol information in received PAR PTSEs is then supplied to a protocol device (5) associated with the PAR-enabled device (1) in a manner dependent on the assigned topology indicators (HC, LC), for example with tags comprising the assigned topology indicators (HC, LC). The information supplied to the protocol device (5) thus reflects the topology indicators (HC, LC) which in turn reflect the location in the PNNI topology of the originating nodes of the PAR PTSEs. This allows the configuration of the network topology for the protocol in question to be controlled in dependence on the underlying PNNI topology.

28 Claims, 5 Drawing Sheets

U.S. PATENT DOCUMENTS

| | | | |
|---|---|---|---|
| 6,600,724 B1* | 7/2003 | Cheng | 370/256 |
| 6,614,762 B1* | 9/2003 | Illiadis et al. | 370/252 |
| 6,633,544 B1* | 10/2003 | Rexford et al. | 370/238 |
| 6,744,734 B1* | 6/2004 | Iliadis et al. | 370/238.1 |
| 6,795,860 B1* | 9/2004 | Shah | 709/229 |
| 6,801,496 B1* | 10/2004 | Saleh et al. | 370/221 |
| 6,829,654 B1* | 12/2004 | Jungck | 709/246 |
| 6,850,486 B1* | 2/2005 | Saleh et al. | 370/218 |
| 6,856,627 B1* | 2/2005 | Saleh et al. | 370/397 |

OTHER PUBLICATIONS

"Proxy PNNI augmented routing (Proxy PAR)", Przygienda, T.; Droz, P.; West, C.; ATM, 1998. ICATM-98., 1998 1st IEEE International Conference on, Jun. 22-24, 1998. pp. 371-377.*

* cited by examiner

Tagged PAR Packet

MANAGEMENT OF PROTOCOL INFORMATION IN PNNI HIERARCHICAL NETWORKS

FIELD OF THE INVENTION

This invention relates generally to management of protocol information in PNNI (Private Network-to-Network Interface) networks. Embodiments of the invention provide methods and apparatus for facilitating efficient mapping of higher layer topologies over the physical ATM (Asynchronous Transfer Mode) network topology.

BACKGROUND OF THE INVENTION

Before discussing the invention in more detail, it is useful to consider some background. PNNI is a hierarchical, dynamic link-state routing protocol defined by the ATM Forum for use in ATM networks. The PNNI protocol provides, inter alia, a system for creation and distribution of topology information which determines how individual network nodes "see" the network and thus how nodes communicate. A key feature of the protocol is the ability to cluster groups of switches into "peer groups". The details of each peer group are abstracted into a single logical node (a "logical group node" or LGN) which is all that can be seen outside of that peer group. One node in each peer group serves as the "peer group leader" and represents that peer group as the logical group node in the next level up of the hierarchy. This system is applied recursively so that PNNI can hierarchically aggregate network topology information. The PNNI topology information available to switches is such that each switch sees the details of its own peer group plus the details of any peer group that represents it at a higher level of the PNNI hierarchy. It is this hierarchical topology abstraction that reduces the resources required to support large-scale ATM networks.

The topology data communicated over PNNI networks is defined by PNNI Topology State Elements (PTSEs). PTSEs include data relating to nodes, links and addresses which can be accessed by network devices, and are created and distributed by nodes so that each node can maintain a topology database which defines its view of the PNNI network. PTSEs are flooded among nodes in a peer group so that each peer group node has the same topology database and thus the same view of the network. In the next level up of the hierarchy, however, the peer group topology is abstracted into a single logical node as described above. The logical group node generates PTSEs advertising addresses accessible within its child peer group and distributes these to its neighbors in the next level of the hierarchy, but the details of nodes and links within the peer group are lost. PTSEs generated by a logical group node in this way are also flooded back down the hierarchy, together with PTSEs received by the LGN from its neighbors, to enable the lower-level nodes to identify their "ancestors" (i.e. their representative nodes at higher levels) and maintain their views of the PNNI topology.

PNNI provides full support for mobility at the ATM layer ("PNNI Addendum for Mobility Extensions v1.0", ATM Forum af-ra-0123.000, April 1999). For example, the PNNI mobility extensions allow a logical group node abstracting a mobile ATM network to roam in the PNNI hierarchy of a terrestrial backbone network Routing information detailing the current location of the mobile network is advertised through regular PNNI, thus enabling the establishment of calls from a terrestrial end-system to an end-system of the mobile network, and vice versa. In addition, ATM networks can be used to carry higher layer protocol information such as IP (Internet Protocol) information. This can conveniently be done by employing an extension to the PNNI protocol known as PAR (PNNI Augmented Routing). PAR is described, for example in "PNNI Augmented Routing (PAR)", af-ra-0104.000, ATM Forum, January 1999. Briefly, PAR allows IP information, which is not related to operation of the ATM network in itself, to be distributed over the network. PAR makes use of the PTSEs discussed above to distribute IP-related information in addition to the ATM topology information. PAR-enabled devices in the network encapsulate IP information in PTSEs which are then distributed in the usual PNNI way. The IP information in these so-called "PAR PTSEs" is opaque to PNNI nodes that are not PAR-enabled, but other PAR-enabled nodes are aware of the format of the IP information in PAR PTSEs. Thus, a PAR-enabled device in the network can communicate IP information over the network by means of PAR PTSEs, and another PAR-enabled device can extract the IP information.

A further extension of the PNNI protocol known as "Proxy-PAR" allows higher layer protocol devices, in particular IP devices such as routers, to communicate IP information over the network without themselves participating in PNNI. Proxy-PAR is also described in "PNNI Augmented Routing (PAR)", af-ra-0104.000, ATM Forum, January 1999. Briefly, Proxy-PAR is a simple exchange protocol which allows the integration of IP devices into ATM networks without the need for the IP devices to run PNNI at all. An IP device can be connected to the network via a PAR-enabled device which is configured as a Proxy-PAR server. The IP device itself is configured as a Proxy-PAR client. In accordance with Proxy-PAR, the Proxy-PAR client can register details of the IP services it supports with the Proxy-PAR server. This information is then encapsulated in PAR PTSEs as previously described and flooded in the network in the usual PNNI way. The Proxy-PAR client can also request the Proxy-PAR server for information on other IP devices connected in the network for which PAR PTSEs have been received by the PAR-enabled device as previously described. In this way, IP information is communicated between IP devices without the devices participating in PNNI.

Through use of PAR and Proxy-PAR as described above, protocol devices, in particular IP devices, can learn about each other via this communication of protocol information over the PNNI network, avoiding the need for manual input in each device of the protocol information needed for configuration of the higher layer protocol topology. For example, IP routers at the edge of an ATM cloud can learn about each other, and manual configuration of the IP adjacencies can be avoided. Further, our copending European Patent Application No. 99115544.1, filed 6 Aug. 1999, discloses mechanisms for dynamic configuration of OSPF (Open Shortest Path First) interfaces in IP routers. Routers in mobile networks, for example, can dynamically configure OSPF interfaces with the OSPF area of other (fixed or mobile) network routers as the mobile network roams and makes new connections. Whether or not OSPF interfaces are configured dynamically, PAR and Proxy-PAR allow routers to register their protocol information (e.g. IP address, ATM address, OSPF area) with their serving ATM switches which then flood the data throughout the network. Other routers can retrieve this IP information by querying their serving ATM switches. Routers can then exchange routing information to form neighbor relationships, or "peer", in the usual way with other routers they learn about from the information received. The resulting IP topology is shaped by this peering between routers.

In general, when PAR is used for communication of protocol information between protocol devices over a PNNI network as described above, the configuration of the higher layer protocol topology over the physical ATM network is shaped by the establishment of relationships between protocol devices (e.g. the peering of IP routers discussed above) based on the protocol information received. A mechanism to facilitate optimization of this topology, and in particular the efficient mapping of the higher layer protocol topology over the underlying ATM network topology, would be highly desirable.

SUMMARY OF THE INVENTION

According to one aspect of the present invention there is provided a method for managing protocol information in a PAR-enabled device of a PNNI hierarchical network, the method comprising:

assigning topology indicators to protocol information encapsulated in respective PAR PTSEs received by the PAR-enabled device from the network, the assignment of a said topology indicator to protocol information in a said PAR PTSE being dependent on the location of the network node which originated that PAR PTSE in the PNNI topology as seen by the PAR-enabled device; and supplying protocol information encapsulated in received PAR PTSEs to a protocol device associated with said PAR-enabled device in a manner dependent on the topology indicators assigned thereto.

Thus, with methods embodying the present invention, a PAR-enabled device receives PAR PTSEs containing protocol information in the usual way, but assigns topology indicators to the protocol information in dependence on the location of the PAR PTSEs' originating nodes in the PNNI topology seen by the PAR-enabled device. Protocol information is then supplied to a protocol device associated with the PAR-enabled device in a manner which depends on the assigned topology indicators. For example, the PAR-enabled device could effectively filter the protocol information in dependence on the assigned topology indicators, only supplying the associated protocol device with certain protocol information to which particular topology indicators have been assigned. In particular, the PAR-enabled device could identify some protocol information as "preferred" and others as "not preferred" based on the topology indicators, and only supply the preferred information to the associated protocol device. Alternatively, for example, the PAR-enabled device could supply the protocol information to the protocol device in an order dependent on the assigned topology indicators and/or with tags comprising the assigned topology indicators. In any case, the information supplied to the protocol device reflects the topology indicators which in turn reflect the location in the PNNI topology of the originating nodes of the PAR PTSEs. The establishment of relationships between the protocol device and other protocol devices in the network can thus be controlled in dependence on the PNNI topology, either because the protocol device only receives details of other protocol devices which are preferred based on the PNNI topology, or (more preferably) because the protocol device is provided with information on the PNNI topology which enables it to select the "best" devices(s) with which to establish a relationship under the protocol in question. Thus, the shaping of the network topology for the protocol in question can be controlled in dependence on the underlying PNNI topology, allowing the network topology for the protocol in question to be optimized according to desired criteria, and facilitating efficient mapping over the physical ATM network.

In the preferred embodiments described in detail below, the protocol information comprises IP information, and the protocol device associated with the PAR-enabled device is an IP device, specifically a router. However, while IP is one particular protocol currently supported by PNNI, it will be apparent to those skilled in the art that PNNI could easily support other protocols. Thus, embodiments can be envisaged where the protocol information comprises IPX (Internetwork Packet Exchange), NetBIOS (Network Basic Input/Output System) or ARP (Address Resolution Protocol) information to name a few, non-exhaustive examples. Similarly, the protocol device associated with the PAR-enabled device could be any device which uses the protocol information extracted from PAR PTSEs in accordance with the protocol in question, such as a router, DNS (Domain Name System) server, ATM ARP server, directory server, or gateway for example. In any case as noted above, the use of topology indicators in embodiments of the invention enables the establishment of relationships between protocol devices to be controlled in dependence on the PNNI topology. The establishment of relationships here may involve the selection of other protocol devices as neighbors or peers, or the establishment of some other type of relationship such as setting up a connection with another protocol device (as between an ATM ARP client and server for example), depending on the particular protocol and protocol devices in question.

The assignment of topology indicators can be performed in various ways in embodiments of the invention depending, for example, on the particular nature of the topology indicators themselves. The assignment step may involve determining whether a topology indicator is assigned at all, or determining the particular topology indicators to be assigned. For example, embodiments can be envisaged where a topology indicator is a simple "preferred protocol information" indicator, in which case topology indicators may only be assigned to protocol information in PAR PTSEs originated by nodes whose location determines that the protocol information should be treated preferentially by the associated protocol device. Protocol information supplied to the protocol device may then be tagged with these indicators as appropriate, so that the protocol device can identify preferred from not-preferred information and select preferred peers accordingly. Of course, topology indicators could include both preferred and not-preferred indicators, so that protocol information supplied to the associated protocol device is tagged as either preferred or not preferred As noted above, the topology indicators could simply be assigned by the PAR-enabled device to determine an order of preference for protocol information to be supplied to the associated protocol device, the protocol device being sensitive to the order in which protocol information (whether or not tagged with the topology indicators) is supplied.

In particular preferred embodiments, each topology indicator comprises a distance value indicative of a logical distance in the PNNI topology between the PAR-enabled device and the network node which originated the PAR PTSE containing the protocol information to which that topology indicator is assigned. For example, the logical distance may be measured in terms of hop count, i.e. the number of links (horizontal links or uplinks) in the hierarchy between the two nodes. The distance value may then be the hop count itself, or some function of the hop count. In addition, or as an alternative, the logical distance may be measured in terms of PNNI costs (administrative weights), or may be a function of dynamic metrics of the PNNI network e.g. QoS (Quality of Service) parameters such as available bandwidth, delay, etc., and the distance value could again consist of the logical distance so-measured between the two nodes, or may be some function of the calculated distance. In further preferred embodiments, each topology indicator comprises (in addition or as an alternative to the distance value) a level value indicative of the level in the PNNI hierarchy of the network node which originated the PAR PTSE containing the protocol information to which that topology indicator is assigned. In particular, the level value may indicate the level of the originating node relative to the PAR-enabled device, for example as a simple level counter. In some embodiments, where an identical topology indicator, such as a distance value and/or level value, has been assigned to protocol information in different PAR PTSEs, the method may include testing for direct connectivity between the PAR-enabled device and those other PAR-enabled devices which first encapsulated that protocol information in PAR PTSEs. Where this test is performed for particular protocol information, the protocol information may be supplied to the associated protocol device in a manner which indicates any protocol information for which this direct connectivity is established as preferred over the protocol information for which direct connectivity is not established. For example, protocol information for which direct connectivity is established may be supplied first, or the topology indicators could include a rank value which indicates that this protocol information should be treated preferentially. A particular example of how this connectivity test may be performed will be described below.

In accordance with Proxy-PAR as discussed above, the protocol device associated with the PAR-enabled device may be an independent device, configured as a Proxy-PAR client (i.e. including control logic for implementing the Proxy-PAR client operations defined by Proxy-PAR), the PAR-enabled device being configured as a Proxy-PAR server (i.e. including control logic for implementing the Proxy-PAR server functions defined by Proxy-PAR). In this case, the protocol information may be supplied by the PAR-enabled device in response to the usual periodic requests from the Proxy-PAR client device. However, other embodiments can be envisaged where the protocol device is integrated with the PAR-enabled device e.g. as a combined device wherein ATM switch logic communicates with, for example, IP router logic via some internal communication protocol. Here, the router logic may periodically poll the PAR-enabled switch logic for IP information, whereupon the IP information may be supplied to the router logic in response to these requests similarly to Proxy-PAR. Alternatively, however, the switch logic could automatically supply the IP information to the router, e.g. at intervals or in response to an event such as a change in the PNNI topology or receipt of new PAR PTSEs from the network. In any case, the assignment of the topology indicators could be performed when the protocol information is to be supplied to the associated protocol device, e.g. when a request is received, or may be performed in advance in some cases, for example when PAR PTSEs are received, depending on the particular implementation. Further, depending on the particular nature of the topology indicators, the step of assigning the topology indicators may include deriving the topology indicators, based on the originating node locations as discussed above, or the topology indicators may be derived in advance for particular originating nodes and only subsequently assigned to particular protocol information according to the originator of the PAR PTSE.

A second aspect of the present invention provides a method for facilitating the use of protocol information by a protocol device associated with a PAR-enabled device of a PNNI hierarchical network, the method comprising:

in the PAR-enabled device, assigning topology indicators to protocol information encapsulated in respective PAR PTSEs received by the PAR-enabled device from the network, the assignment of a said topology indicator to protocol information in a said PAR PTSE being dependent on the location of the network node which originated that PAR PTSE in the PNNI topology as seen by the PAR-enabled device, and supplying protocol information encapsulated in received PAR PTSEs to said protocol device in an order dependent on the topology indicators assigned thereto; and in the protocol device, selecting, in dependence on said order, at least one further protocol device with which to establish a relationship from further protocol devices identified by the protocol information supplied by the PAR-enabled device.

A third aspect of the present invention provides a method for facilitating the use of protocol information by a protocol device associated with a PAR-enabled device of a PNNI hierarchical network, the method comprising:

in the PAR-enabled device, assigning topology indicators to protocol information encapsulated in respective PAR PTSEs received by the PAR-enabled device from the network, the assignment of a said topology indicator to protocol information in a said PAR PTSE being dependent on the location of the network node which originated that PAR PTSE in the PNNI topology as seen by the PAR-enabled device, and supplying protocol information encapsulated in each received PAR PTSE to said protocol device with a tag comprising the topology indicator assigned thereto; and in the protocol device, selecting, in dependence on the tags supplied with the protocol information by the PAR-enabled device, at least one further protocol device with which to establish a relationship from further protocol devices identified by the supplied protocol information.

A fourth aspect of the invention provides a PAR-enabled device for connection in a PNNI hierarchical network, the PAR-enabled device comprising:

memory for storing topology data, defining the PNNI topology as seen by the PAR-enabled device when connected in a said network, and PAR PTSEs received by the PAR-enabled device from the network; and control logic configured to assign topology indicators to protocol information encapsulated in respective received PAR PTSEs, the assignment of a said topology indicator to protocol information in a said PAR PTSE being dependent on the location in said PNNI topology of the network node which originated that PAR PTSE;

wherein the control logic is configured to manage the supply of protocol information encapsulated in received PAR PTSEs to a protocol device associated with said PAR-enabled device in a manner dependent on the topology indicators assigned thereto.

The control logic in the PAR-enabled device may be configured to control the supply of protocol information encapsulated in received PAR PTSEs to the protocol device such that the protocol information is supplied in an order dependent on the topology indicators, or such that the protocol information is supplied with tags comprising the assigned topology indicators.

Further aspects of the invention provide protocol devices for connection in PNNI hierarchical networks via a PAR-enabled device as described above. The invention also extends to PNNI hierarchical networks including such devices. Another aspect of the invention provides a computer program element comprising computer program code means which, when loaded in a processor of a PAR-enabled device for connection in a PNNI hierarchical network, configures the processor to perform a method as described above.

In general, it is to be understood that where features are described herein with reference to a method embodying the invention, corresponding features may be provided in apparatus embodying the invention, and vice versa.

BRIEF DESCRIPTION OF THE DRAWINGS

Preferred embodiments of the invention will now be described, by way of example, with reference to the accompanying drawings in which.

DETAILED DESCRIPTION OF THE INVENTION

The preferred embodiment of the invention will be described in the context of a mobile network system wherein IP information is communicated between IP routers via PAR and Proxy-PAR. In the mobile environment, where low-bandwidth wireless links are usually the most important system resources, it is especially important to optimize the overlay of IP over ATM. In particular, it will generally be desirable to map the IP topology as closely as possible to the physical ATM network topology. The ATM network is viewed from the IP layer as a NBMA (Non-Broadcast Multiple Access) network wherein every address is reachable directly, and the IP topology can be shaped by appropriate peering between IP routers. For example, a mobile network router might be configured to instantiate at most three OSPF interfaces, and the goal may be to ensure that the router communicates with the three routers which are topologically closest to itself. This type of facility becomes critical for the scalability of a solution where the mobile ATM topology is extended to support ad-hoc networking, where mobile networks can communicate with each other with or without reachback to the fixed network infrastructure. For example, mobile networks may be provided on respective ships of a fleet, ad-hoc networks being formed as groups of ships come into contact with one another via line-of-sight links, and periodic connectivity to the fixed network on the ground being established as ships come into range of satellite connections to access points of the fixed network. Ad-hoc networks can be quite large, and for efficient IP overlay here it is desirable that routers do not build a full mesh of SVCs (Switched Virtual Circuits) between themselves, but only instantiate a few OSPF interfaces and peer with the topologically closest routers. This problem is illustrated in FIG. 1 which is a schematic representation of an ad-hoc mobile network system.

Figure 1:
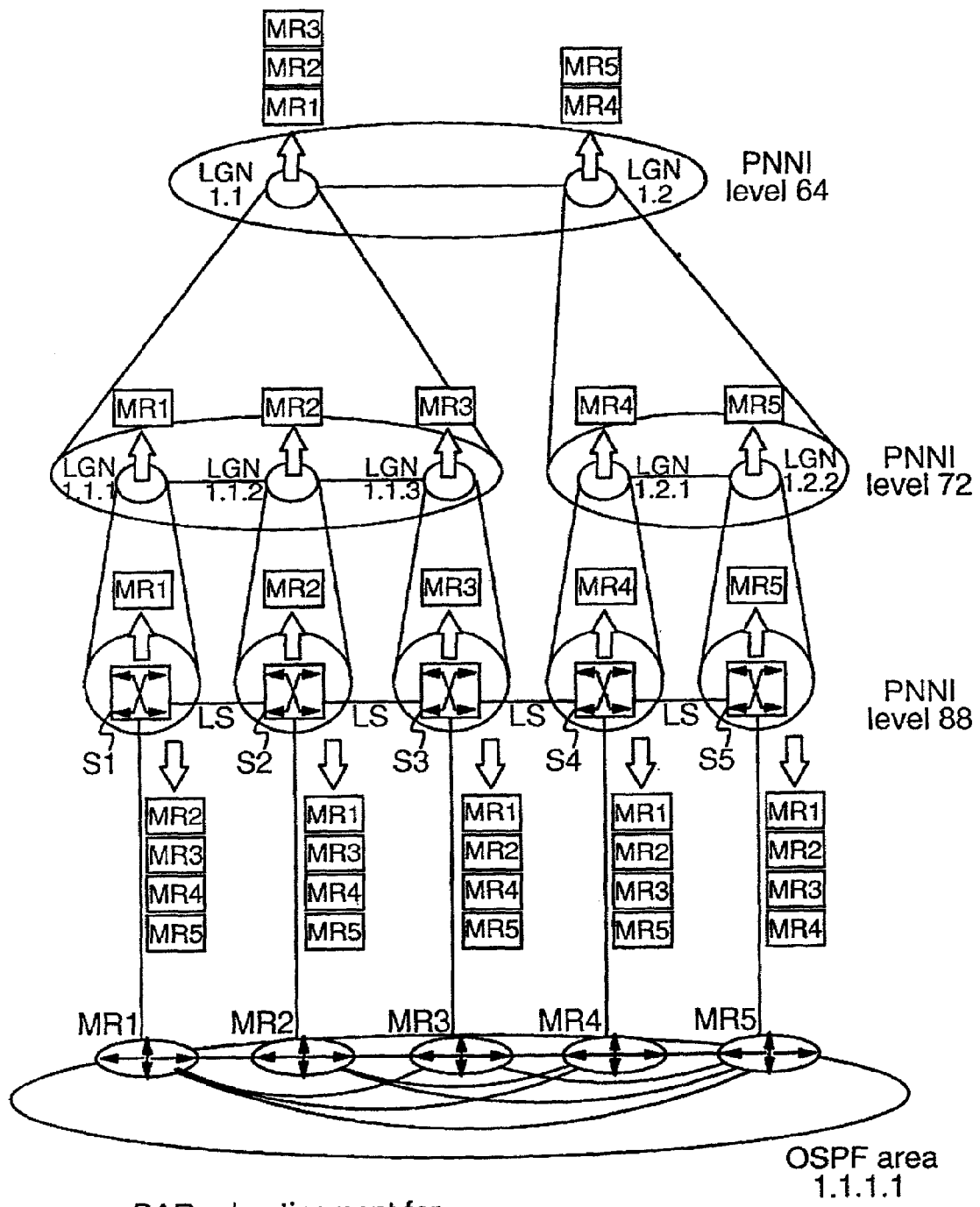
FIG. 1 is a schematic illustration of a mobile network system showing the PNNI hierarchy and communication of IP information in the system.

In the example of FIG. 1, five mobile networks are each represented for simplicity by a switch, S1 to S5, connected to a mobile network router, MR1 to MR5 respectively. The switches S1 to S5 are interconnected as illustrated via line-of-sight links LS between the mobile platforms. Each switch S1 to S5 represents a PNNI peer group (indicated by the ellipses in the figure) at the lowest level of the PNNI hierarchy, PNNI level 88.

The next level up of the hierarchy, level 72, constitutes a first mobile platforms ad-hoc integration level. At this level, the mobile networks of switches S1 to S3 are represented by logical group nodes LGN1.1.1, LGN1.1.2 and LGN1.1.3 respectively. Switches S4 and S5 are similarly represented by logical group nodes LGN1.2.1 and LGN1.2.2 in level 72. The three nodes LGN1.1.1. to LGN1.1.3 form one peer group in level 72, and the two nodes LGN1.2.1 and LGN1.2.2 form another peer group at this level. These two level 72 peer groups are in turn represented by nodes LGN1.1 and LGN1.2 respectively, and these nodes form a peer group in the next hierarchy level, level 64, which constitutes a second mobile platforms ad-hoc integration level in this example. Here, there is no connectivity to the fixed network infrastructure, but if connectivity were established between a mobile network and a fixed network access point, then the hierarchy would be integrated at a higher level, the "access points level" of the PNNI hierarchy.

Each switch S1 to S5 is PAR-enabled and so can advertise IP information in the PNNI network by flooding PAR PTSEs, and can extract IP information from PAR PTSEs received from the network. Further, each switch is configured as a Proxy-PAR server, and each router MR1 to MR5 as a Proxy-PAR client, whereby IP information is communicated between a router and its serving switch in accordance with Proxy-PAR as discussed above.

Proxy-PAR allows a router to indicate a scope when registering its IP information with its serving switch, and the IP information encapsulated in PAR PTSEs by the switch is then flooded in the ATM network up to the PNNI level matching the specified scope. In the present example, each mobile router has registered an OSPF interface with OSPF area 1.1.1.1 with a scope equivalent to PNNI level 64. Thus, for example, a PAR advertisement comprising the IP information registered with switch S1 by router MR1 will be flooded within the switch's level 88 peer group (represented by a single switch in this simplified example) and received by the peer group leader which represents the peer group as LGN1.1.1. in level 72. The IP information is then flooded, via PAR PTSEs generated by LGN1.1.1 in level 72, to LGN1.1.2 and LGN1.1.3. These nodes flood the received PTSEs down to their child peer groups, whereupon the IP information is received by switches S2 and S3 and communicated via Proxy-PAR to their client routers MR2 and MR3. Similarly, the IP information will be flooded via PTSEs generated by LGN1.1 at level 64 to LGN1.2. This node then floods the received PTSEs down to its child peer groups, whereupon the IP information is received by switches S4 and S5 and communicated via Proxy-PAR to their client routers MR4 and MR5. Thus, each PAR-enabled switch in level 88 communicates PAR information received from the network in PAR PTSEs to its client router, and, as indicated schematically by the PAR advertisements in the figure, each router receives IP information from each other router in the network. (It should be noted that not all PAR information received from the network may be forwarded by a switch to its client router. In particular, the switch may employ filtering mechanisms as disclosed in our copending European Patent Application entitled "Management of Protocol Information in PNNI Hierarchical Networks", filed concurrently with the present application under Agent's reference CH9-2000-0024, the content of which is incorporated herein by reference. The PAR advertisements shown in the figures herein have been simplified on the assumption that, as is preferred, such filtering mechanisms have been employed, and in particular that duplicate PAR advertisements received by a switch from its ancestors in the hierarchy have been filtered to exclude PAR information in PAR PTSEs generated at all but the lowest possible hierarchical level).

Figure 2:
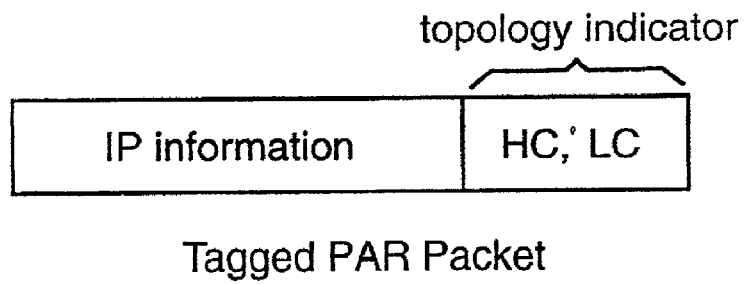
FIG. 2 is a schematic illustration of a PAR service description packet supplied by a switch embodying the invention to an associated router.

As noted above, the result of the communication of IP information in FIG. 1 is that each mobile router receives from its serving switch four PAR service description packets, detailing all other network routers. Each router then peers with each other router, resulting in a full mesh of OSPF adjacencies (neighbor relationships) between the routers as indicated in the figure. In the embodiments of the invention to be described, this problem is solved by adding abstracted topology information to the PAR service description packets supplied by a switch to its client router. In particular, the switch tags the packet with a topology indicator as indicated schematically in FIG. 2. The topology indicator assigned to particular IP information is derived by the switch according to the location, in the PNNI topology as seen by the switch, of the network node which originated the PAR PTSE in which the IP information was received by the switch. In the present embodiment, the topology indicator comprises a distance value, here in the form of a hop count HC, and a level value, here in the form of a level count LC. The hop count HC is a count of the number of links, i.e. uplinks and horizontal links (physical or logical), between the serving switch and the originating node of the PAR PTSE in the PNNI topology seen by the switch. The level count LC is a count of the number of PNNI levels between the switch and the originating node in the PNNI topology seen by the switch.

Figure 3:
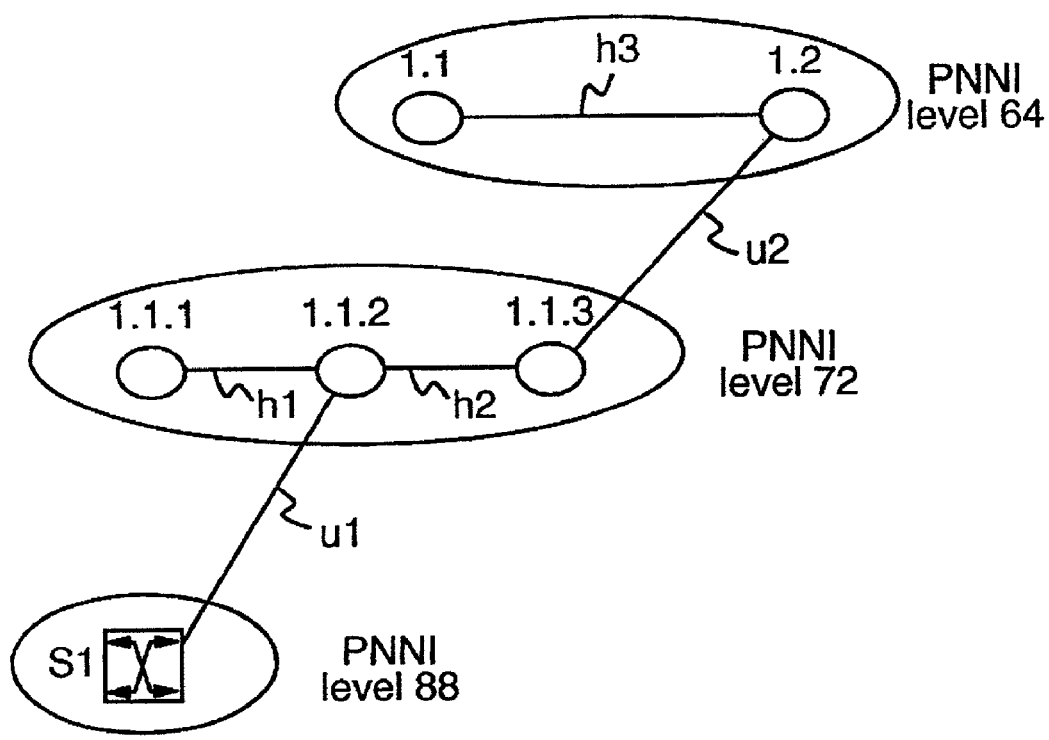
FIG. 3 illustrates the PNNI topology seen by one switch of the system of FIG. 1.

As previously described, the communication of PNNI topology data in an ATM network is such that each switch sees the details of its own peer group plus the details of any peer group that represents it at a higher level of the PNNI hierarchy. For example, the topology seen by switch S1 in the system of FIG. 1 is as illustrated in FIG. 3. In this view of the topology, S1 is connected to level 72 LGN1.1.2 via uplink u1, and LGN1.1.2 is connected to LGN1.1.1 and LGN1.1.3 via horizontal links h1 and h2 respectively. Similarly, LGN1.1.3 is connected to level 64 LGN1.2 via uplink u2, and LGN1.2 is connected to LGN1.1 via horizontal link h3. Thus: LGN1.1.2 is at a level count of 1 and a hop count of 1 (uplink u1) from S1; LGN1.1.3 is at a level count of 1 and a hop count of 2 (u1, h2) from S1; and LGN1.2 is at a level count of 2 and a hop count of 3 (u1, h2, u2) from S1. Each switch therefore assigns an appropriate topology indicator HC, LC to IP information received from the network according to the originating node of the received PAR PTSE, and tags the PAR service description packet sent to its client router with the topology indicator. In the present preferred embodiment, the order in which the switch supplies tagged IP information with identical topology indicators is significant, reflecting the result of a connectivity test described further below. Based on the PNNI topology information conveyed by the switch through supplying the IP information in this way, the router can select preferred peers from among the routers from which IP information is received, and the IP topology can thus be mapped closely to the underlying ATM topology.

Figure 4:
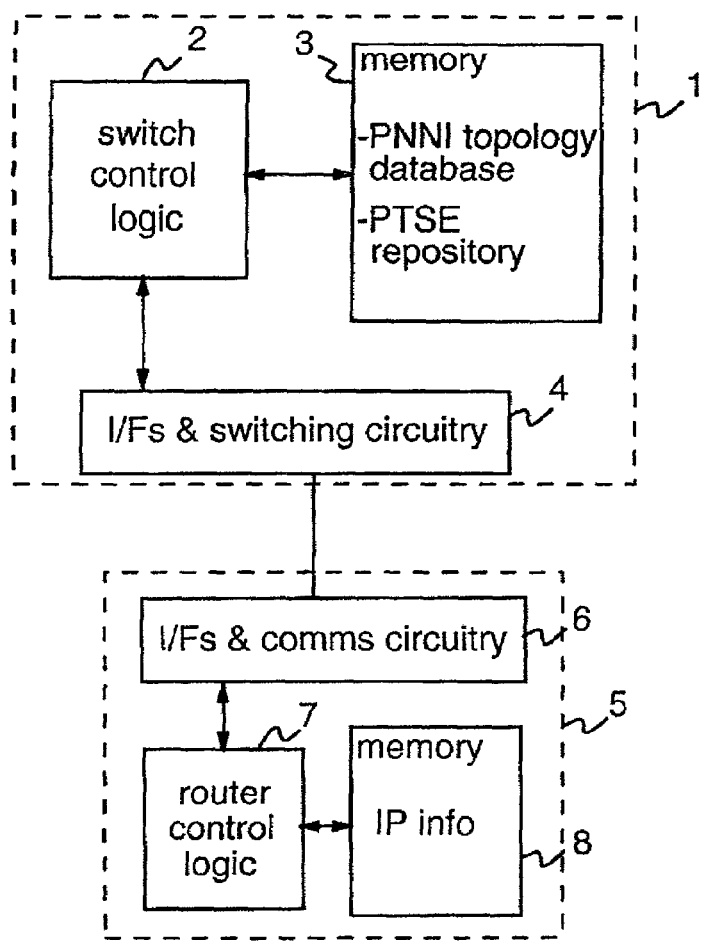
FIG. 4 is a schematic block diagram of a switch and associated router embodying the invention.

FIG. 4 is a simplified schematic illustrating the main elements of a switch and router involved in operation of this embodiment. The switch 1 comprises control logic 2, memory 3 and circuitry 4 comprising the interfaces and switching circuitry via which the device communicates with the rest of the network and the associated router 5. The router 5 similarly comprises communications circuitry 6 via which the router interfaces with the network, router control logic 7 and associated memory 8. The switch 1 is a PAR-enabled device serving as a Proxy-PAR server for router 5. The switch control logic 2 controls operation of the device generally, and implements the usual PNNI PAR and Proxy-PAR functions. In addition, the control logic 2 performs the functions described in detail below for managing IP information communicated to router 5 in operation. In accordance with PNNI, control logic 2 maintains a topology database in memory 3 containing data defining the device's view of the network topology as described above, together with a PTSE repository in which PTSEs received from the network are stored until either they expire or are flushed by the usual PNNI processes. Similarly, router control logic 7, which includes Proxy-PAR client logic for communication of IP data with switch 1 via Proxy-PAR, controls general operation of the router in the usual way, maintaining IP protocol information for the IP network in memory 8. Router control logic 7 is also responsive to the IP information management services provided by switch 1 which enable preferential selection of peer routers as described below. In general, the control logic 2, 7 may be implemented in hardware or software, or a combination thereof, but will typically be implemented by a processor running software which configures the processor to perform the functions described, and suitable software will be apparent to those skilled in the art from the description herein. (Of course, while processors in the switch 1 and router 5 may be preconfigured with appropriate software, the program code constituting such software could be supplied separately for loading in the devices to configure the processors to operate as described. Such program code could be supplied as an independent element or as an element of the program code for a number of control functions, and may be supplied embodied in a computer-readable medium such as a diskette or an electronic transmission sent to a network operator).

Figure 5:
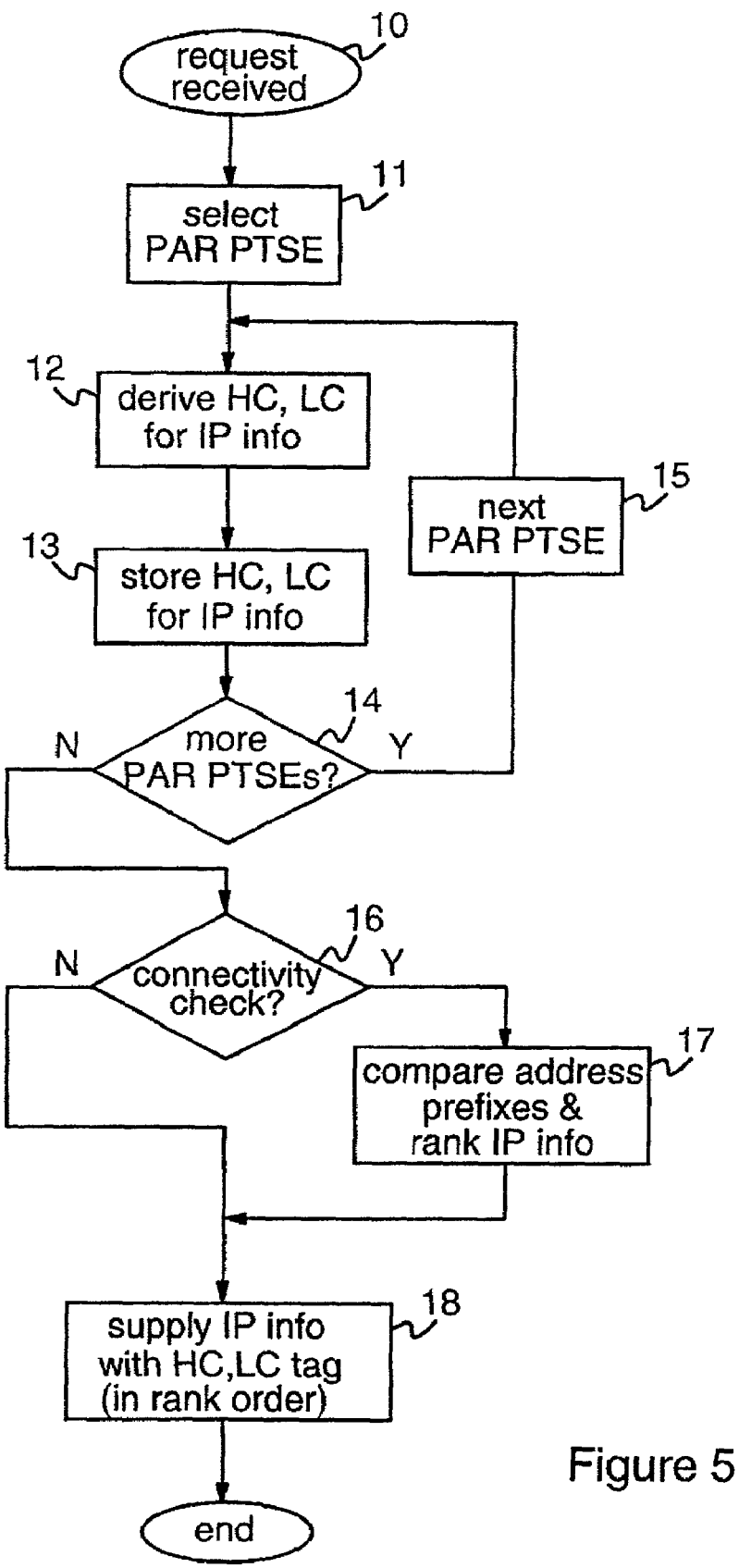
FIG. 5 is a flow chart illustrating the IP information management method implemented by the FIG. 4 switch in an embodiment of the invention.

In operation in network system as described with reference to FIG. 1, the switch 1 receives PAR PTSEs from the network and these are stored by control logic 2 in the PTSE repository of memory 3. In response to the periodic Proxy-PAR requests issued by router control logic 7, switch control logic 2 extracts IP information from PAR PTSEs stored in memory 3 and supplies this in PAR service description packets to router 1. FIG. 5 illustrates in more detail the operations performed by the switch control logic 2 as part of this IP information communication process. On receipt of a Proxy-PAR request from the router as indicated at step 10 of FIG. 5, the control logic 2 accesses the PTSE repository in memory 3 and, at step 11, selects a first PAR PTSE according to the request issued by the router. Next, in step 12, the control logic derives the topology indicator HC, LC to be assigned to the IP information in the selected PAR PTSE. Specifically, the control logic compares the originating node id specified in the PAR PTSE with the node id's stored in the topology database of memory 3, and calculates the appropriate values of HC and LC according to the location of the originating node in the PNNI topology defined in the topology database as described with reference to FIG. 3. At step 13, the resulting topology indicator is then stored in memory 3 as associated with the relevant IP information. Next, in step 14 the control logic 2 checks whether there are any further PAR PTSEs in memory 3 to be considered, and, assuming so, the next PAR PTSE is selected in step 15 and operation reverts to step 12 for this PTSE.

Once topology indicators have been assigned to IP information in all relevant PAR PTSEs, as indicated by a "No" at step 14, in this embodiment operation proceeds to step 16 where the control logic decides whether a connectivity test should be performed. Specifically, if IP information from two or more PAR PTSEs has been assigned an identical topology indicator HC, LC, then a connectivity test will be performed in this example. Operation then proceeds to step 17 where the control logic tests whether the switch 1 has a physical connection to the switch serving the router which generated that IP data (i.e. the switch which first encapsulated that IP information in a PAR PTSE). To do this, the control logic compares the 13-byte prefix of the ATM address specified in the IP information for the IP service in question with the prefix of the ATM address contained in Hello Packets received on its physical links with other switches. If the address prefixes match for particular IP information, then this IP information is ranked as higher priority (e.g. by setting a rank flag associated with the topology indicator) than the other IP information with identical indicators for which no direct connectivity is established here. The effect of this ranking based on connectivity checking will be described further below. (Note that this particular test assumes that routers use the ATM address prefix of their serving switch, as will be the case in preferred embodiments of mobile network systems. Also, some systems could manage the IP information based on the result of this test alone. In particular, if routers only peered with other routers which were one hop away (i.e. HC=1), then this test could be used to identify IP information from preferred peer routers. The IP information to be supplied by the switch to its associated router could then be tagged, filtered or ordered accordingly based on the result of this test. Such a system would of course be of highly limited application).

From step 17 (or from step 16 if it is decided here that no connectivity test is required), operation proceeds to step 18 as indicated. Here, the control logic supplies the IP information, tagged with the assigned topology indicator HC, LC, to the router 5 via circuitry 4. Here, where a rank has been established as discussed above for IP information with identical topology indicators, the IP information is supplied in rank order, i.e. with IP information for which connectivity has been established supplied first.

Figure 6:
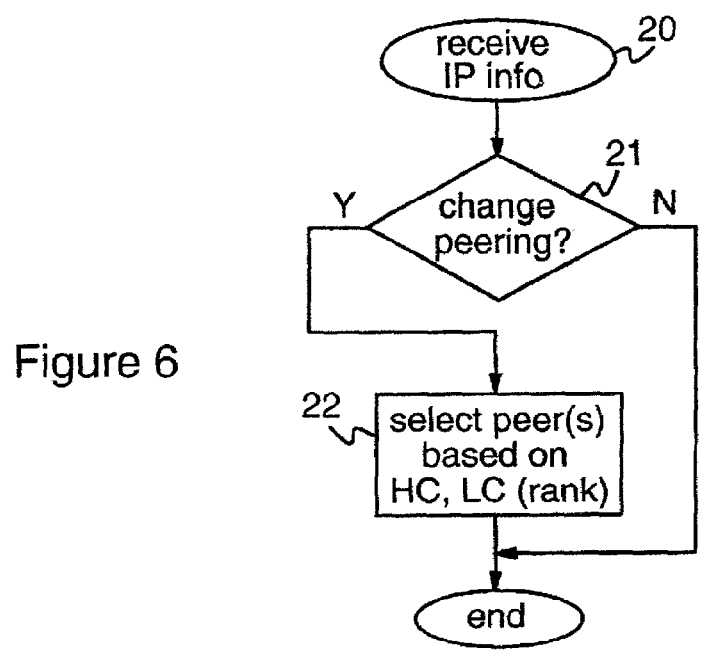
FIG. 6 is a flow chart illustrating the peer assessment process performed by the FIG. 4 router in this embodiment.

Thus, control logic 2 manages the supply of IP information to router 5 so as to convey (via the abstracted topology information represented by the topology indicators and the order in which the IP information is supplied) information indicative of the proximity in the PNNI network of the routers which generated the IP information. This can be used by the router to select preferred peers as illustrated schematically in FIG. 6. When the router control logic 7 receives the tagged IP information from switch 1 as indicated at step 20 of FIG. 6, the control logic 7 then decides at step 21 whether new peer relationships should be formed. As a simple example, the control logic may be configured to allow a maximum of, say, three peer relationships, and must ensure that these are established with the "best" routers. In this embodiment, preferred routers are those which are topologically closest based on the topology information provided by the switch. If no peering has yet been performed by the router, or if the information received indicates a new router as a preferred peer, then the control logic will decide at step 21 that the current peer situation must be changed. Assuming initially that no peers have been established when the IP information is received from the switch, then operation will proceed from step 21 to step 22 wherein the control logic selects the preferred peer routers based on order of HC, LC and, for identical values of HC, LC, based on the order in which the IP information is received. Thus, for example, the three topologically closest routers, as indicated by the values of the topology indicators (and rank order where appropriate), may be selected, and the neighbor relationships are then set up in the usual way. All IP information received from the switch is stored in memory 8 by control logic 5 for future use. In response to a subsequent Proxy-PAR request, if the best three routers identified by the received PAR packets differ from the router's current peers (e.g. due to a newly-connected router or a router that is no longer reachable), then in step 21 the control logic 5 determines that the current peering should be changed. In this case, at step 22 the control logic selects the preferred router (or routers) identified in the received packets and peers with the new router(s), breaking off the peer relationship with each old router that has been displaced in the order of preference.

Figure 7:
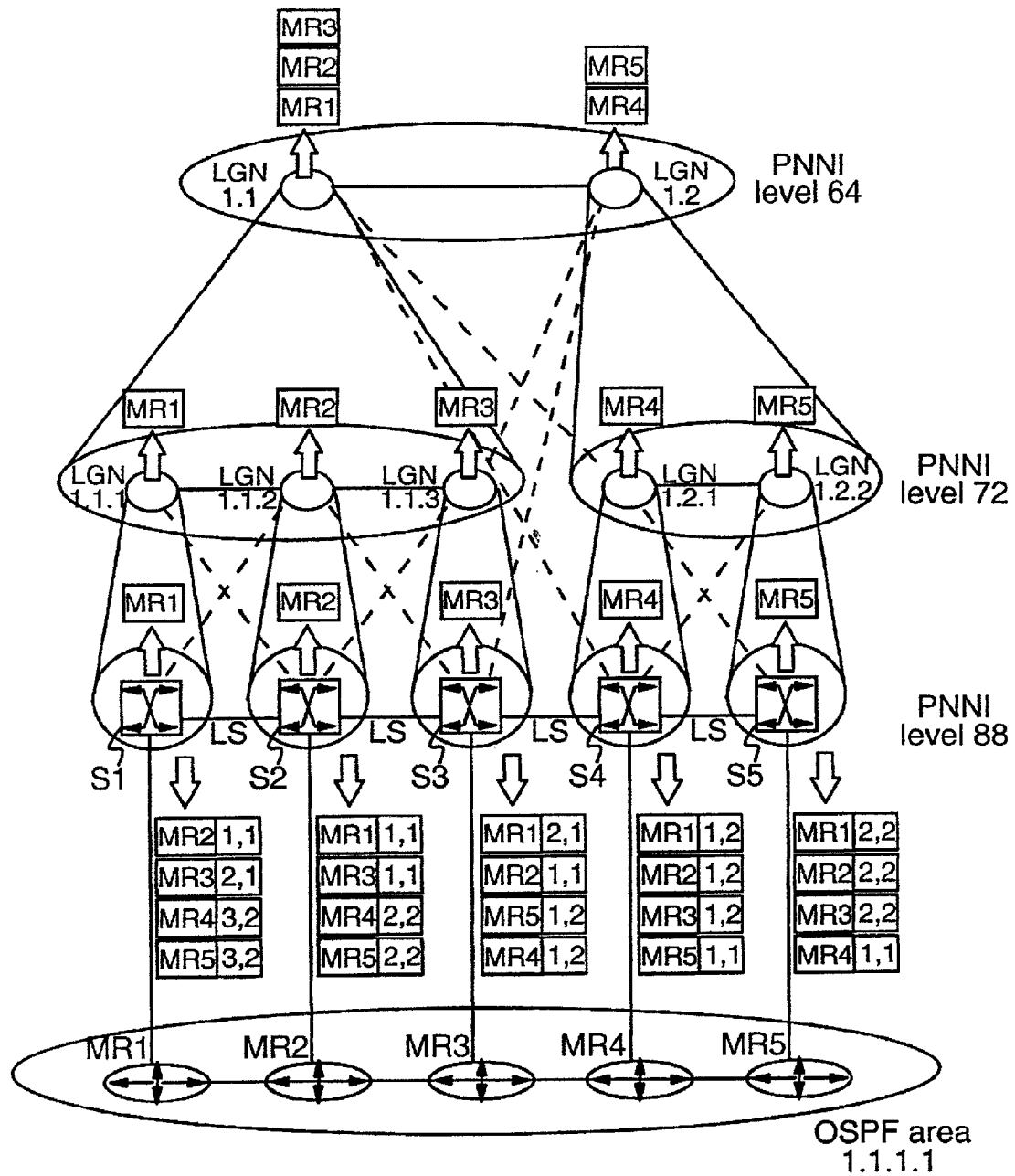
FIG. 7 illustrates operation of the FIG. 1 network with switches and routers embodying the invention.

FIG. 7 illustrates application of the above embodiment in the network system of FIG. 1. Here, each switch S1 to S5, and router MR1 to MR5, operates as described with reference to FIGS. 2 to 6. In this case, however, it is assumed that each router is configured to peer only with other routers that are one hop away (i.e. HC=1), and then only with a maximum of two other routers. The PAR service description packets received by a router from its serving switch are shown tagged with the appropriate topology indicators HC, LC in the figure, and the uplinks between nodes are indicated by dashed lines for ease of reference. Based on the tagged IP information received, each router has peered with the "best" other router or routers according to the peer selection constraints. Specifically: MR1 has peered only with MR2; MR2 has peered with MR1 and MR3; MR3 has peered with MR2 and MR4; MR4 has peered with MR3 and MR5; and MR5 has peered only with MR4.

The advantage of including the level count LC in the topology indicators is illustrated here by considering switch S3. This switch receives a PAR PTSE originated by LGN1.1.2 containing PAR information from router MR2, and also receives PAR PTSEs originated by LGN1.2 containing PAR information from routers MR4 and MR5. Both LGN1.1.2 and LGN1.2 are at a hop count of one from switch S3, so the PAR information from routers MR2, MR4 and MR5 is tagged with HC=1 when forwarded by switch S3 to router MR3. Absent any further information, there would then be a risk of router MR3 peering with routers MR4 and MR5 and not with router MR2. However, addition of the level count LC distinguishes MR2 as preferred over MR4 and MR5, ensuring that MR2 is selected as a peer router by MR3. Providing information about the PNNI level in this way is thus an important factor in balancing the peering between routers and avoiding the formation of disconnected IP islands. The hop count provides a useful distance measure but this alone is a "flat" measure which does not take into account the hierarchy. By providing information about the level at which a PAR PTSE has been generated, a router can, for example, give preference to routers which are located at the lowest level of the hierarchy. Clearly, however, the use of level information depends on the particular criteria adopted for optimizing the IP topology as discussed further below.

Consideration of switches S3 and S4 in FIG. 7 demonstrates the further advantage of ranking based on connectivity checking. By performing the connectivity test discussed above, switch 3 determines that it has direct connectivity to the serving switch for MR4, but not to the serving switch for MR5. Thus, switch 3 ranks PAR information from MR4 higher than that from MR5, and the PAR information for MR4 is forwarded to MR3 before the PAR information for MR5. Router MR3 thus selects routers MR2 and MR4 as its preferred peers. Similarly, switch S4 ranks PAR information for MR3 higher than PAR information for MR2, whereby router MR4 peers with the preferred routers MR3 and MR5.

It will be seen that the tagging of IP information with abstracted PNNI topology information in the above embodiment, and the use of this topology information in peering decisions, allows the IP topology to be shaped to achieve efficient mapping of IP over ATM. It will be appreciated however, that many changes and modifications can be made to the embodiment described without departing from the scope of the invention. For example, rather than tagging the IP information with the topology indicators as above, the switch could simply supply the IP information in order of preference based on the assigned topology indicators, the router simply identifying the order of preference of potential peers from the order in which IP information is received in response to a Proxy-PAR request. In other embodiments, the switch could tag IP information with a simple "preferred" or "not preferred" marker. However the PNNI topology information is conveyed, the system should preferably be consistent for all P information delivered by the switch, i.e. for each type of service such as OSPF, RIP (Routing Information Protocol), and DNS (Domain Name System). While the topology indicators are derived dynamically by the switch in response to a Proxy-PAR request in the above embodiment, these could be derived in advance in some embodiments (e.g. by storing the values of HC and LC associated with each node in the topology database) and assigned to IP information when required. Alternatively, for example, the topology indicator for IP information could be derived and assigned on receipt of the PAR PTSE in some embodiments.

As another example, while the router identifies low values of the level count LC as preferred in the above example, the level count can be used by routers to give preference to potential peers in the fixed network infrastructure. PAR information from fixed network routers would be received by mobile switches in PAR PTSEs originated at the access points level, which is higher than the ad-hoc networking levels. A high level count, corresponding to the access points level, can thus be used by routers to identify peers on the ground. Moreover, it will be appreciated by those skilled in the art that the level value could be represented as a UNI (User-Network Interface) scope. Further, while the switch control logic derives HC and LC in the above embodiment by comparing the originating node id in the PAR PTSE with node id's stored in the topology database, in other embodiments the control logic may compare the ATM address of the originating node as specified in the PAR PTSE with the ATM addresses of nodes as stored in the topology database. Also, while the connectivity test described above could be performed whenever identical topology indicators have been assigned, this test might only be performed for IP information from a set of routers indicated as topologically closest by the distance and/or level values, and for which the distinction is thus likely to be particularly relevant to the client router. Of course, the rank based on the connectivity test could be indicated in the topology indicator itself if desired.

It will be appreciated that Point-to-Multipoint OSPF areas, rather than an NBMA area, may be used in network systems embodying the invention. In addition, while the switch and router in the above embodiment are separate devices communicating via Proxy-PAR, embodiments can be envisaged where the router is integrated with the PAR-enabled device. In this case, the router logic may communicate with the PAR logic via some other, internal, communications protocol.

Further, while a hop count and a level count are used in the above embodiment, the distance value could be some other value, such as a sum of PNNI administrative weights (costs), or could depend on dynamic metrics of the PNNI network such as QoS parameters. Taking dynamic metrics into account would allow a router to select peers based on end-to-end delay for example (e.g. avoiding satellite links whenever possible). In some embodiments, the forwarding cost of an IP interface (e.g. in OSPF or RIP) could be generated automatically by routers from the distance value in the topology indicator. In particular, where the sum of PNNI administrative weights is used as a distance measure, the derivation of the IP interface costs can be based on the weights configured in the ATM network Various combinations of the different types of topology indicator and data ordering systems can be envisaged as advantageous in different scenarios.

It will be appreciated that, although an example of the invention has been described in the context of a mobile environment where the considerations addressed are especially critical, embodiments of the invention can also be applied to advantage in fixed network systems, facilitating auto-configuration of the IP topology. Further, as discussed earlier, embodiments of the invention may be applied with protocols other than IP, and with protocol devices other than IP routers.

We claim:

1. A method for managing protocol information in a PAR-enabled device of a PNNI hierarchical network, the method comprising:
    assigning topology indicators to protocol information encapsulated in respective PAR PTSEs received by the PAR-enabled device from the network, the assignment of a topology indicator to protocol information in a PAR PTSE being dependent on the location of the network node which originated that PAR PTSE in the PNNI topology as seen by the PAR-enabled device; and
    supplying protocol information encapsulated in received PAR PTSEs to a protocol device associated with said PAR-enabled device in a manner dependent on the topology indicators assigned thereto.

2. A method according to claim 1 wherein the protocol information is supplied to the protocol device in an order dependent on the assigned topology indicators.

3. A method according to claim 1 wherein the protocol information encapsulated in a received PAR PTSE is supplied to the protocol device with a tag comprising the assigned topology indicator.

4. A method according to claim 1 wherein each topology indicator comprises a distance value indicative of a logical distance in said PNNI topology between the PAR-enabled device and the network node which originated the PAR PTSE containing the protocol information to which that topology indicator is assigned.

5. A method according to claim 4 wherein said logical distance is defined as a function of hop count.

6. A method according to claim 4 wherein said logical distance is defined as a function of PNNI costs.

7. A method according to claim 4 wherein said logical distance is defined as a function of dynamic metrics of the PNNI network.

8. A method according to claim 1 wherein said topology indicator comprises a level value indicative of the level in the PNNI hierarchy of the network node which originated the PAR PTSE containing the protocol information to which that topology indicator is assigned.

9. A method according to claim 8 wherein said level value is indicative of the level of said network node in the PNNI hierarchy relative to the level of said PAR-enabled device in the PNNI hierarchy.

10. A method according to claim 1 including, for protocol information in each of at least some received PAR PTSEs to which an identical topology indicator has been assigned, testing for direct connectivity between said PAR-enabled device and another PAR-enabled device which first encapsulated that protocol information in a PAR PTSE, and supplying the protocol information in said at least some PAR PTSEs to the protocol device in a manner which indicates any protocol information for which said direct connectivity is not established.

11. A method according to claim 10 wherein the protocol information in said at least some received PAR PTSEs is supplied to the protocol device in a n order dependent on whether said direct connectivity is established.

12. A method according to claim 1 including supplying the protocol information to the protocol device in response to a request from the protocol device.

13. A method according to claim 1 including assigning the topology indicators, and supplying the protocol information to the protocol device, in response to a request from the protocol device.

14. A method according to claim 12 wherein the PAR-enabled device is configured as a Proxy-PAR server and the protocol device is configured as a Proxy-PAR client.

15. A method according to claim 1 wherein the step of assigning the topology indicators includes the step of deriving the topology indicators for the protocol information in respective PAR PTSEs.

16. A method according to claim 1 wherein said protocol information comprises IP information.

17. A method according to claim 1 wherein said protocol device comprises a router.

18. A method for facilitating the use of protocol information by a protocol device associated with a PAR-enabled device of a PNNI hierarchical network, the method comprising:
in the PAR-enabled device, assigning topology indicators to protocol information encapsulated in respective PAR PTSEs received by the PAR-enabled device from the network, the assignment of a topology indicator to protocol information in a PAR PTSE being dependent on the location of the network node which originated that PAR PTSE in the PNNI topology as seen by the PAR-enabled device, and supplying protocol information encapsulated in received PAR PTSEs to said protocol device in an order dependent on the topology indicators assigned thereto; and
in the protocol device, selecting, in dependence on said order, at least one further protocol device with which to establish a relationship from further protocol devices identified by the protocol information supplied by the PAR-enabled device.

19. A method for facilitating the use of protocol information by a protocol device associated with a PAR-enabled device of a PNNI hierarchical network, the method comprising:
in the PAR-enabled device, assigning topology indicators to protocol information encapsulated in respective PAR PTSEs received by the PAR-enabled device from the network, the assignment of a topology indicator to protocol information in a PAR PTSE being dependent on the location of the network node which originated that PAR PTSE in the PNNI topology as seen by the PAR-enabled device, and supplying protocol information encapsulated in each received PAR PTSE to said protocol device with a tag comprising the topology indicator assigned thereto; and
in the protocol device, selecting, in dependence on the tags supplied with the protocol information by the PAR-enabled device, at least one further protocol device with which to establish a relationship from further protocol devices identified by the supplied protocol information.

20. A PAR-enabled device for connection in a PNNI hierarchical network, the PAR-enabled device comprising:
memory for storing topology data, defining the PNNI topology as seen by the PAR-enabled device when connected in said network, and PAR PTSEs received by the PAR-enabled device from the network; and
control logic configured to assign topology indicators to protocol information encapsulated in respective received PAR PTSEs, the assignment of a topology indicator to protocol information in a PAR PTSE being dependent on the location in said PNNI topology of the network node which originated that PAR PTSE;
wherein the control logic is configured to manage the supply of protocol information encapsulated in received PAR PTSEs to a protocol device associated with said PAR-enabled device in a manner dependent on the topology indicators assigned thereto.

21. A PAR-enabled device according to claim 20 wherein the control logic is configured to control the supply of protocol information encapsulated in received PAR PTSEs to said protocol device such that the protocol information is supplied to the protocol device in an order dependent on the topology indicators assigned thereto.

22. A protocol device for connection in a PNNI hierarchical network via a PAR-enabled device according to claim 21, the protocol device comprising control logic configured to select, in dependence on said order which the protocol information is supplied to the protocol device by the PAR-enabled device in use, at least one further protocol device with which to establish a relationship from further protocol devices identified by the supplied protocol information.

23. A PAR-enabled device according to claim 20 wherein the control logic is configured to supply protocol information encapsulated in a received PAR PTSE to said protocol device with a tag comprising the topology indicator assigned thereto.

24. A protocol device for connection in a PNNI hierarchical network via a PAR-enabled device according to claim 23, the protocol device comprising control logic configured to select, in dependence on the tags supplied with the protocol information received by the protocol device from the PAR-enabled device in use, at least one further protocol device with which to establish a relationship from further protocol devices identified by the received protocol information.

25. A PNNI hierarchical network comprising a plurality of PAR-enabled devices and a plurality of protocol devices, each PAR-enabled device being associated with a said protocol device for communication over the network of protocol information generated by that protocol device, wherein said PAR-enabled devices include at least one PAR-enabled device according to claim 20.

26. A PNNI hierarchical network comprising a plurality of PAR-enabled devices and a plurality of protocol devices, each PAR-enabled device being associated with a protocol device for communication over the network of protocol information generated by that protocol device, wherein:

said PAR-enabled devices include at least a first PAR-enabled device comprising:

memory for storing topology data, defining the PNNI topology as seen by said first PAR-enabled device, and PAR PTSEs received by said first PAR-enabled device from the network; and control logic configured to assign topology indicators to protocol information encapsulated in respective received PAR PTSEs, the assignment of a topology indicator to protocol information in a PAR PTSE being dependent on the location in said PNNI topology of the network node which originated that PAR PTSE; the control logic being further configured to manage the supply of protocol information encapsulated in received PAR PTSEs to the protocol device associated with said first PAR-enabled device such that the protocol information is supplied to the protocol device in an order dependent on the topology indicators assigned thereto;

and wherein the protocol device associated with said first PAR-enabled device comprises control logic configured to select, in dependence on said order in which protocol information is supplied by said first PAR-enabled device, at least one further protocol device with which to establish a relationship from further protocol devices identified by the supplied protocol information.

27. A PNNI hierarchical network comprising a plurality of PAR-enabled devices and a plurality of protocol devices, each PAR-enabled device being associated with a protocol device for communication over the network of protocol information generated by that protocol device, wherein:

said PAR-enabled devices include at least a first PAR-enabled device comprising:

memory for storing topology data, defining the PNNI topology as seen by said first PAR-enabled device, said PAR PTSEs received by said first PAR-enabled device from the network; and control logic configured to assign topology indicators to protocol information encapsulated in respective received PAR PTSEs, the assignment of a topology indicator to protocol information in a PAR PTSE being dependent on the location in said PNNI topology of the network node which originated that PAR PTSE; the control logic being further configured to manage the supply of protocol information encapsulated in received PAR PTSEs to the protocol device associated with said first PAR-enabled device such that the protocol information encapsulated in a received PAR PTSE is supplied with a tag comprising the topology indicator assigned thereto;

and wherein the protocol device associated with said first PAR-enabled device comprises control logic configured to select, in dependence on the tags supplied with the protocol information by said first PAR-enabled device, at least one further protocol device with which to establish a relationship from further protocol devices identified by the supplied protocol information.

28. A computer program product comprising a computer readable medium having embodied therein computer readable program code means for causing a processor of a PAR-enabled device of a PNNI hierarchical network to perform a protocol information management method comprising the steps of:

assigning topology indicators to protocol information encapsulated in respective PAR PTSEs received by the PAR-enabled device from the network, the assignment of a topology indicator to protocol information in a PAR PTSE being dependent on the location of the network node which originated that PAR PTSE in the PNNI topology as seen by the PAR-enabled device; and managing the supply of protocol information encapsulated in received PAR PTSEs to a protocol device associated with said PAR-enabled device in a manner dependent on the topology indicators assigned thereto.

* * * * *